US 6,592,017 B2

(12) United States Patent
Morris et al.

(10) Patent No.: US 6,592,017 B2
(45) Date of Patent: Jul. 15, 2003

(54) AUTOMATIC DROSS REMOVAL APPARATUS AND METHOD

(75) Inventors: James M. Morris, Lebanon, MO (US); Scott Willis, Camdenton, MO (US); David M. McDonald, Camdenton, MO (US)

(73) Assignee: Speedline Technologies, Inc., Franklin, MA (US)

( * ) Notice: Subject to any disclaimer, the term of this patent is extended or adjusted under 35 U.S.C. 154(b) by 0 days.

(21) Appl. No.: 09/759,506

(22) Filed: Jan. 12, 2001

(65) Prior Publication Data
US 2002/0092897 A1 Jul. 18, 2002

(51) Int. Cl.[7] .............................. B23K 1/00; B23K 3/06
(52) U.S. Cl. ........................ 228/34; 220/56.2; 220/102
(58) Field of Search ................................ 210/143, 523, 210/525; 228/34, 56.2, 102

(56) References Cited

U.S. PATENT DOCUMENTS

| 2,937,757 A | 5/1960 | Pisani |
| 3,217,959 A | 11/1965 | Di Renzo |
| 3,893,657 A | 7/1975 | Sieurin |
| 3,941,360 A | 3/1976 | Blank ............................ 266/37 |
| 3,980,219 A | 9/1976 | Schmid ........................ 228/34 |
| 4,220,318 A | 9/1980 | Anderson et al. ............. 266/49 |
| 4,332,373 A | 6/1982 | Huppunen et al. .......... 266/228 |
| 4,509,670 A | 4/1985 | Cammarata .................. 228/34 |
| 4,540,163 A | 9/1985 | van Linden |
| 4,610,391 A | 9/1986 | Nowotarski ................. 228/219 |
| 4,802,617 A | 2/1989 | Deambrosio ............. 228/180.1 |
| 5,087,356 A | 2/1992 | Webb .......................... 210/143 |
| 5,755,889 A | 5/1998 | Johnson ........................ 75/414 |

FOREIGN PATENT DOCUMENTS

WO     WO 00/02695     1/2000

OTHER PUBLICATIONS

International Search Report, for PCT US02/00665 mailed Aug. 8, 2002.
International Search Report. for PCT US 02/00665 mailed Dec. 19, 2002.

Primary Examiner—Tom Dunn
Assistant Examiner—Zidia Pittman
(74) Attorney, Agent, or Firm—Mintz, Levin, Cohn, Ferris, Glovsky and Popeo, P.C.

(57) ABSTRACT

An automatic dross removal apparatus, which can be used with a solder wave apparatus, is provided, that generally includes a reservoir having a cavity for containing liquid solder, dross removal apparatus having a first end extending within the cavity of the reservoir for removing dross on the surface of the liquid solder, and a motor engaged with the dross removal apparatus. In one embodiment of the invention, the dross is automatically removed by a conveyor driven by a motor. In another embodiment of the invention, the dross is automatically removed by a motor driven receptacle. Means for moving the dross from one part of the solder reservoir to another, such as a pump, can be included. Preferably, a computer is used to control the automatic dross removal. The dross can be placed in a dross separation device which can include apparatus for processing the dross to remove any remaining solder.

8 Claims, 4 Drawing Sheets

AUTOMATIC DROSS REMOVAL APPARATUS AND METHOD

FIELD OF THE INVENTION

The present application relates generally to apparatus and methods for removing dross from the surface of liquid or molten solder.

BACKGROUND OF THE INVENTION

During normal containment of liquid solder in a solder reservoir such as that used by a wavesolder device, a metallic oxide forms which is referred to as dross. The dross floats on the solder surface and must periodically be removed from the solder reservoir to prevent contamination of the solder. The manual removal of the dross results in machine down time to remove the dross from the solder reservoir. This machine down time can result in a high cost of ownership due to frequent maintenance to remove these oxides.

One prior art device is a wavesolder designed so that the dross flows into an area at one end of the solder pot reservoir such that a machine operator will manually scoop out the generated dross into a basket for removal. However, the manual removal of the dross can still be time consuming.

Other devices allow the removal of dross from the surface, such as apparatus shown in U.S. Pat. No. 5,087,356 to Webb, U.S. Pat. No. 4,509,670 to Cammarata and U.S. Pat. No. 3,980,219 to Schmid. However, these devices do not function optimally because they in part do not provide for the reclamation of excess solder from collected dross.

SUMMARY OF THE INVENTION

An automatic dross removal apparatus, which can be used with a solder wave apparatus, generally includes a reservoir having a cavity for containing liquid solder, dross removal apparatus having a first end extending within the cavity of the reservoir for removing dross on the surface of the liquid solder, and a motor engaged with the dross removal apparatus. In one embodiment of the invention, the dross is automatically removed by a conveyor driven by a motor. In another embodiment of the invention, the dross is automatically removed by a motor driven receptacle. Means for moving the dross from one part of the solder reservoir to another, such as a pump, a nozzle, a sloped surface or channel, a paddle or a moving edge, can be included. Preferably, a computer is used to control the automatic dross removal. The dross can be placed in a dross separation device which can include apparatus for processing the dross to remove any remaining solder.

An advantage of embodiments of the present invention is that a machine having a reservoir of solder, such as a wavesoldering device, does not have to be shut down to remove dross from the surface of the solder.

Another advantage of embodiments of the present invention is that dross can be removed from a solder reservoir without operator interaction, which creates a more maintenance free machine.

DETAILED DESCRIPTION OF THE INVENTION

Figure 1:
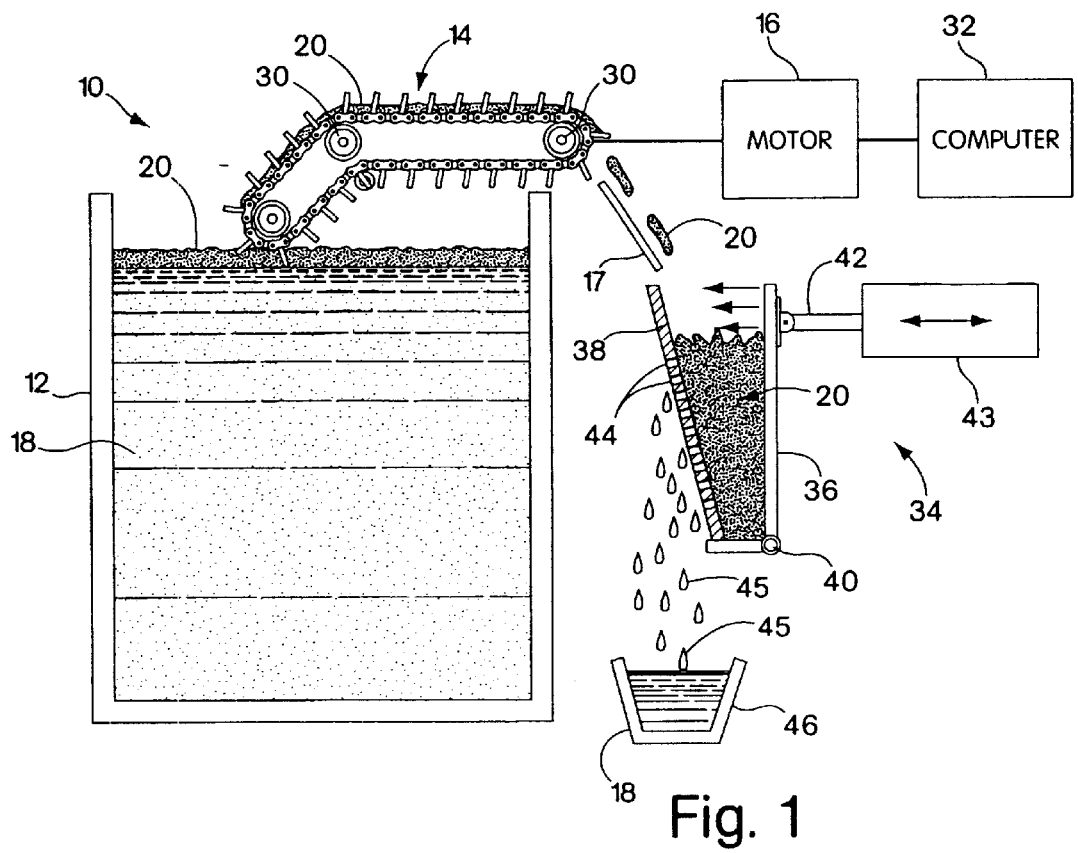
FIG. 1 is a cross sectional side view of one embodiment of an automatic dross removal apparatus in accordance with the invention.

FIG. 1 shows an embodiment of the automatic dross removal apparatus 10. The apparatus 10 includes a solder reservoir 12 and a conveyor 14 that is driven by a motor 16. The reservoir 12 contains liquid solder 18 which has dross 20 forming on its top surface. A dross removal mechanism, such as a conveyor 22, has one end protruding into the solder reservoir 12 to skim the dross 20 from the surface of the solder 18 and carry it on the conveyor. The conveyor 14 is driven by a motor 28 that drives a sprocket 30 that engages and drives the endless belt or chain of the conveyor for removing the dross from the pot. The conveyor can have one or more brackets 15, such as an angle bracket. When power is supplied to the motor, the conveyor draws the angled bracket forward, dragging the dross on the conveyor and over the edge of the solder reservoir. The conveyor motor is preferably driven by a computer 32 such that the dross removal apparatus 10 can operate automatically with or without operator intervention. Alternatively, the conveyor motor 16 can be controlled by a switch. Preferably, the conveyor motor 16 is computer controlled through timers with overload protection for the device.

Figure 2:
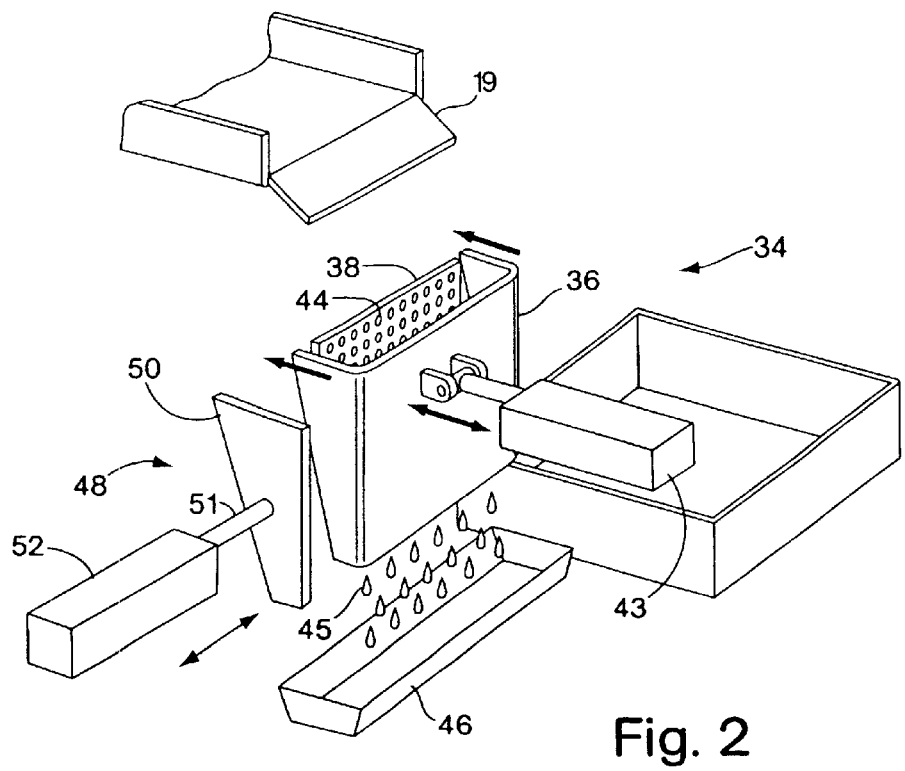
FIG. 2 is a front isometric view of a dross reclamation device used in conjunction with the automatic dross removal apparatus of FIG. 1.

The conveyor 22 or other dross removal mechanism removes the dross from the solder reservoir, sends it over chute 17 and deposits it into a container or a dross separation device 34 for further processing. One embodiment of the dross separation device 34, which is shown in FIGS. 1 and 2, includes a first portion 36 and a second portion 38. The first and second portions are movable in relation to one another such that the dross recovered from the solder reservoir 12 can be compressed to remove any usable molten solder. For example, the first portion 36 of device 34 can include a pivot 40 or hinge and be connected to a piston 42 or cylinder that is driven by a motor 43. The second portion 38 can include holes 44 of an appropriate size such that molten solder drops 45 flow through the holes and drops into a receptacle 46.

As shown in FIG. 2, the dross separation device 34 can include an ejection device 48 that can include, for example, a first portion 50 for ejecting the solder depleted dross, and a piston 51 or cylinder that is driven by a motor 52. The ejection device 48 can eject dross by moving outwardly in the direction of the dross separation device 34 after the first portion 36 is opened such that it is pivoted outwardly from the second portion 38. A conveyor chute 19 for depositing the dross into the dross separation device 34 can also be provided.

Figure 3:
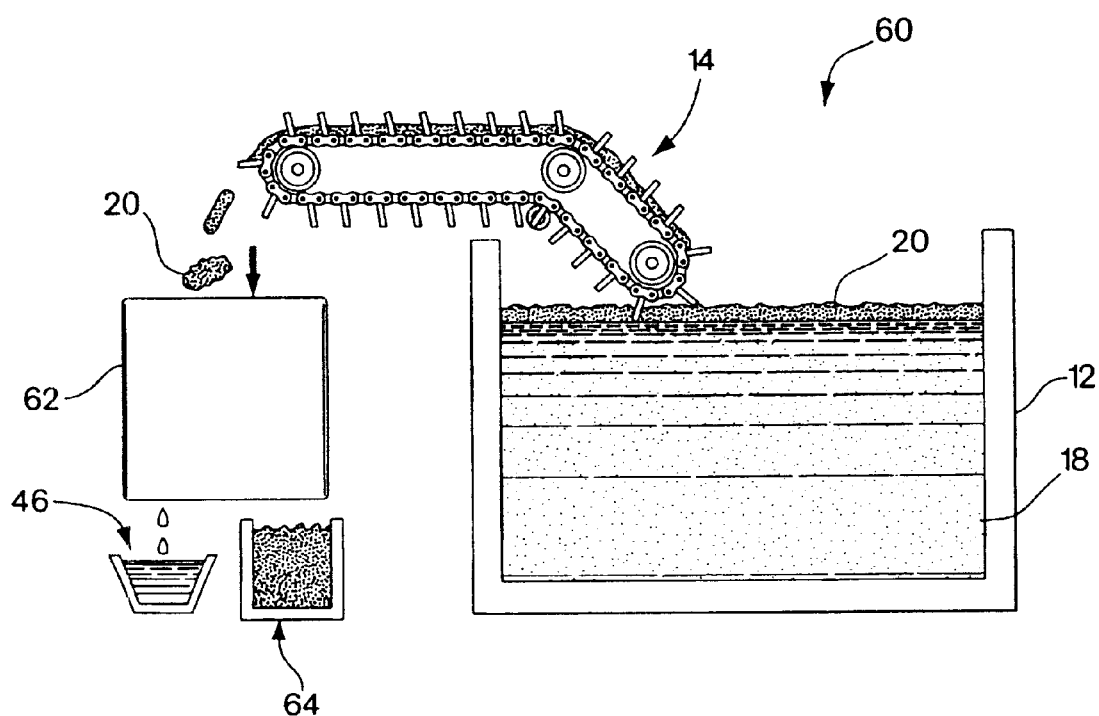
FIG. 3 is a cross sectional side view of another dross reclamation device used in conjunction with the automatic dross removal apparatus of FIG. 1.

FIG. 3 shows an embodiment of the automatic dross removal apparatus 60 that uses a dross separation device 62 which separates the dross into receptacle 64 and reusable solder into receptacle 46. The dross separation device 60 can be a device such as the dross muncher manufactured by the company Solet located in the United Kingdom. Alternatively, dross separation device 60 could be some other manufactured device.

Figure 4:
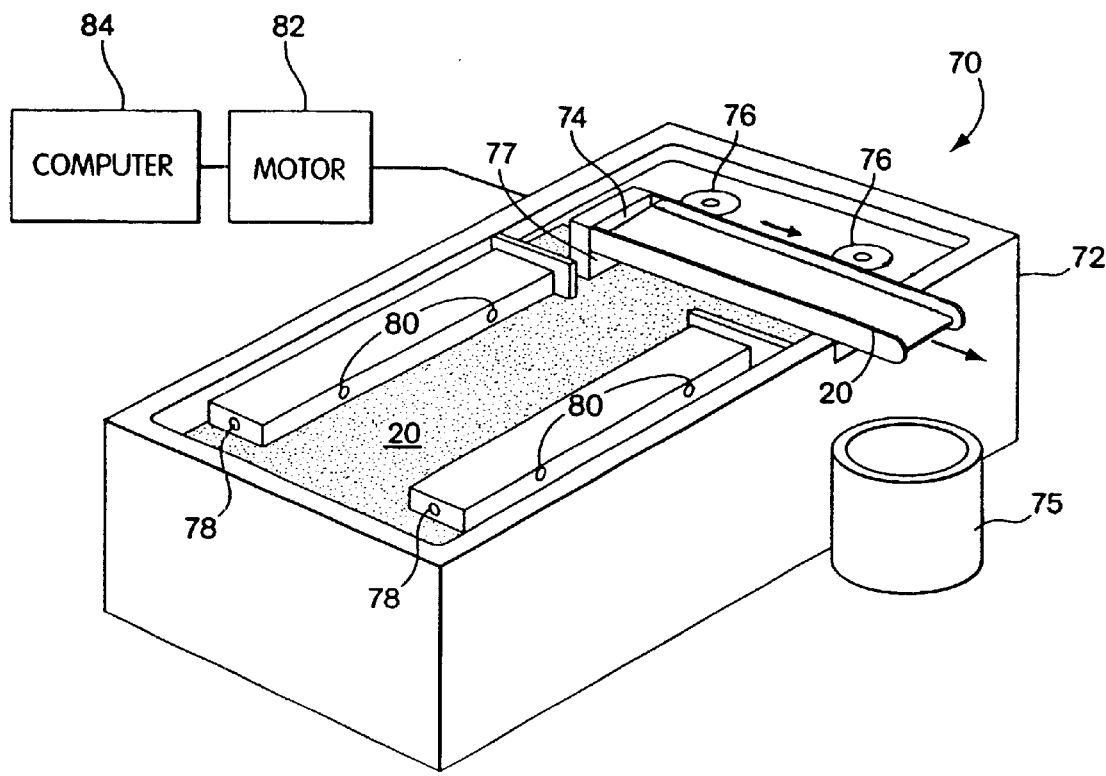
FIG. 4 is a front isometric view of another embodiment of an automatic dross removal apparatus in accordance with the invention.
Figure 5:
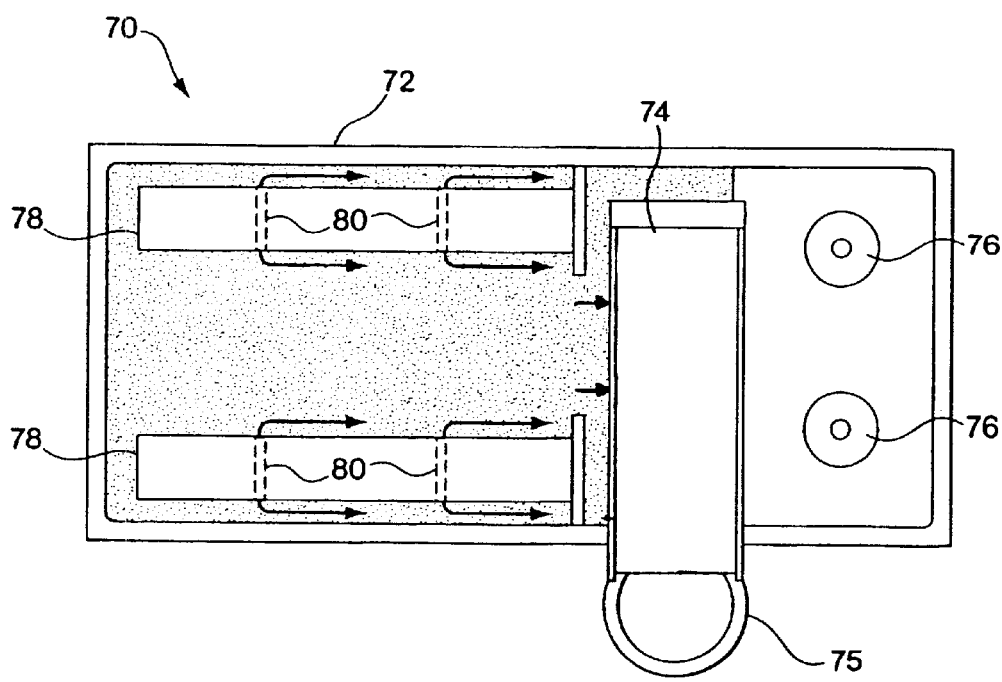
FIG. 5 is a top view of the automatic dross removal apparatus of FIG. 4.

FIGS. 4 and 5 show a second embodiment of the automatic dross removal apparatus 70. The apparatus 70 has a solder reservoir 72 and a dross skimmer 74 having one end 77 protruding into the reservoir 72 for moving or pushing the dross that is directed towards it. The apparatus 70 also has a means for moving the dross within the reservoir towards the skimmer 74 such as one or more pumps 76 and pressure nozzles 78, which use channels to direct the dross to the skimmer 74. The nozzle 78 has a main wave nozzle entrance and exit side weir chambers 80 that are connected internally via tubing allowing more even flow and to increase the exit side flow to sufficiently flush out the dross 20 from the nozzle. The dross flows out of the nozzles in one direction flushing any dross with it, toward the removal mechanism. A gas inert with solder such as nitrogen can be used to pressurize the nozzle to remove and/or limit oxygen to further reduce dross formation.

Like the dross removal apparatus 10, the dross removal apparatus 70 can be driven by a motor 82 for automatically moving the skimmer 70 to place the dross in a receptacle 75. The motor 82 is preferably driven by a computer 84 such that the dross removal apparatus 70 can operate automatically with or without operator intervention. Alternatively, the motor 82 can be controlled by a switch. Preferably, the motor 82 is computer controlled through timers with overload protection for the device.

Figure 6:
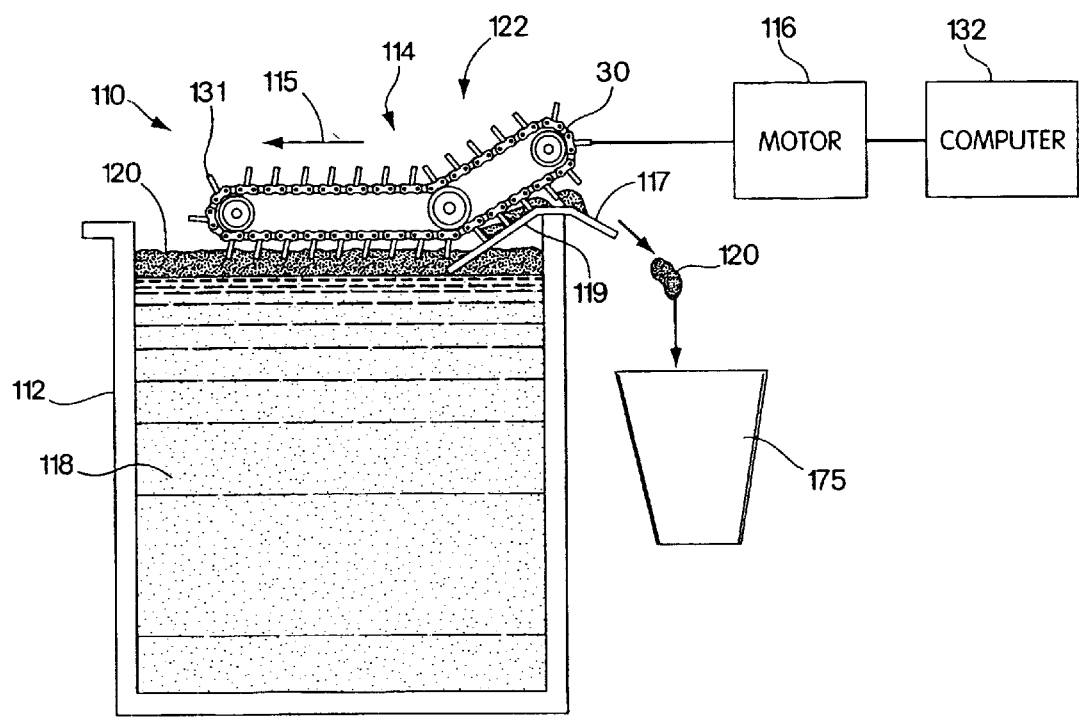
FIG. 6 is a cross sectional side view of yet another embodiment of an automatic dross removal apparatus in accordance with the invention.
Figure 7:
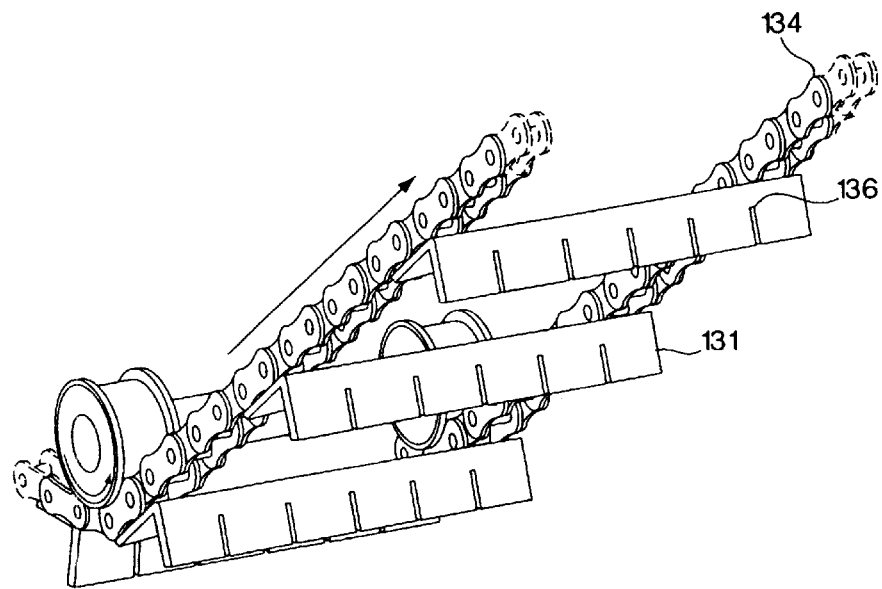
FIG. 7 is a front isometric view of the conveyor of the automatic dross removal apparatus of FIG. 6.

FIGS. 6 and 7 show a second embodiment of the automatic dross removal apparatus 110. The dross removal apparatus 110 is generally similar to the dross removal apparatus 10 of FIG. 1 with the exception that the conveyor 140 moves in an opposite direction to the conveyor 14 in a direction shown by arrow 115. As shown in FIG. 6 and best in FIG. 7, the conveyor 140 has two endless chains 134 that support a plurality of L-shaped brackets 131. The brackets 131 preferably have one or more slots 136 to allow liquid solder 118 to pass therethrough.

The dross removal apparatus 110 includes a solder reservoir 112 and a conveyor 114 that is driven by a motor 116. The reservoir 112 contains liquid solder 118 which has dross 120 forming on its top surface. A conveyor 122 has one end protruding into the solder reservoir 112 to skim the dross 120 from the surface of the solder 118, push it up the surface of ramp 119 and dump it into receptacle 175. Alternatively, the dross could be placed in a dross separation device as shown in either FIGS. 2 or 3. The conveyor 114 is driven by a motor 116 which drives a sprocket 130 that engages and drives the endless belt or chain of the conveyor. The conveyor can have one or more brackets 131, such as an angle bracket. When power is supplied to the motor, the conveyor draws the angled bracket in the direction of arrow 115, and drags the dross on the ramp 119 and over the edge of the solder reservoir. The conveyor motor 116 is preferably driven by a computer 132 such that the dross removal apparatus 110 can operate automatically with or without operator intervention. Alternatively, the conveyor motor 116 can be controlled by a switch. Preferably, the conveyor motor 116 is computer controlled through timers with overload protection for the device.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. An automatic dross removal apparatus for a reservoir having a cavity for containing liquid solder, the apparatus comprising:

a skimmer having a first end extending within the cavity of the reservoir and being movable within the reservoir for moving dross on the surface of the liquid solder out of the reservoir;

a motor adapted to move the skimmer for removing the dross from the reservoir; and one or more pumps for moving the dross within the reservoir towards the skimmer.

2. An automatic dross removal apparatus for a reservoir having a cavity for containing liquid solder, the apparatus comprising:

a skimmer having a first end extending within the cavity of the reservoir and being movable within the reservoir for moving dross on the surface of the liquid solder out of the reservoir;

a motor adapted to move the skimmer for removing the dross from the reservoir; and one or more sloped channels for moving the dross within the reservoir towards the skimmer.

3. An automatic dross removal apparatus for a reservoir having a cavity for containing liquid solder, the apparatus comprising:

a skimmer having a first end extending within the cavity of the reservoir and being movable within the reservoir for moving dross on the surface of the liquid solder out of the reservoir;

a motor adapted to move the skimmer for removing the dross from the reservoir;

means for moving the dross within the reservoir towards the skimmer, and a dross separation device adjacent a second end of the skimmer for separating solder from the dross collected from the reservoir.

4. The automatic dross removal apparatus of claim 3, wherein the dross separation device comprises:

a first portion;

a second portion being in a movable relation to the first portion, one of the first and second portions having a perforated section for allowing the liquid solder to pass therethrough; and means for moving the first portion in relation to the second portion.

5. An automatic dross removal apparatus for a reservoir having a cavity for containing liquid solder, the apparatus comprising:

a skimmer having a first end extending within the cavity of the reservoir and being movable within the reservoir for moving dross on the surface of the liquid solder and out of the reservoir;

a motor adapted to move the skimmer for removing the dross from the reservoir;

at least one channel for moving the dross within the reservoir towards the skimmer;

a computer electrically connected to the motor for controlling the motor; and a dross separation device for separating solder from the dross collected from the automatic dross removal apparatus.

6. The automatic dross removal apparatus and dross separation device of claim 5, wherein the dross separation device comprises:

a first portion;

a second portion being in a movable relation to the first portion, one of the first and second portions having a perforated section for allowing the liquid solder to pass therethrough; and means for moving the first portion in relation to the second portion.

7. The automatic dross removal apparatus of claim 6, wherein the means for moving the first portion in relation to the second portion comprises a piston operatively connected to a second motor.

8. A method for automatically removing dross from a solder reservoir having a cavity for containing liquid solder, the method comprising:

providing a skimmer having a first end extending within the cavity of the reservoir and being movable within the reservoir;

providing a motor adapted to move the skimmer;

moving the dross within the reservoir towards the skimmer;

moving dross on the surface of the liquid solder out of the reservoir by driving the motor to move the skimmer and remove the dross from the reservoir;

providing a dross separation device being adjacent a second end of the skimmer; and separating excess solder from the removed dross by placing the dross collected from the automatic dross removal apparatus into the dross separation device.

* * * * *